Feb. 8, 1955          H. SCHOEPE          2,701,477

CHANGE SPEED TRANSMISSION AND CONTROL THEREFOR

Filed Aug. 14, 1953          5 Sheets-Sheet 1

INVENTOR.
HARRY SCHOEPE

Fig. 3

Feb. 8, 1955 H. SCHOEPE 2,701,477
CHANGE SPEED TRANSMISSION AND CONTROL THEREFOR
Filed Aug. 14, 1953 5 Sheets-Sheet 4

INVENTOR.
HARRY SCHOEPE
BY Hudson, Boughton,
Williams, David & Hoffmann
ATTORNEYS.

Feb. 8, 1955  H. SCHOEPE  2,701,477

CHANGE SPEED TRANSMISSION AND CONTROL THEREFOR

Filed Aug. 14, 1953  5 Sheets-Sheet 5

| SPEED | III | IV | V | VI |
|---|---|---|---|---|
| 1 | L | L | L | L |
| 2 | H | L | L | L |
| 3 | L | H | L | L |
| 4 | H | H | L | L |
| 5 | L | L | H | L |
| 6 | L | L | H | L |
| 7 | H | L | H | L |
| 8 | L | H | H | L |
| 9 | L | H | H | L |
| 10 | L | L | L | H |
| 11 | H | L | L | H |
| 12 | H | H | L | H |
| 13 | L | L | H | H |
| 14 | H | L | H | H |
| 15 | L | H | H | H |
| 16 | H | H | H | H |

INVENTOR.
HARRY SCHOEPE
BY Hudson, Boughton,
Williams, David & Hoffmann
ATTORNEYS

United States Patent Office 2,701,477
Patented Feb. 8, 1955

2,701,477

CHANGE SPEED TRANSMISSION AND CONTROL THEREFOR

Harry Schoepe, Seven Hills, Ohio, assignor to The Warner & Swasey Company, Cleveland, Ohio, a corporation of Ohio Application August 14, 1953, Serial No. 374,206

16 Claims. (Cl. 74—364)

This invention relates to a change speed transmission particularly adapted to be used in the headstock of a machine tool and to the control for said transmission. It will be understood that the transmission and the control therefor are susceptible of use in other types of apparatus or machinery.

In modern machine tools it is desirable that the rotating work or tool spindle be capable of being driven at a relatively large number of different speeds. This is also the case in other types of apparatus having a member that is to be driven at different speeds. In order to provide the desired number of different speeds of the spindle or driven member the change speed transmission in the headstock or transmission housing tends to be bulky, to require the use of long shafts and to necessitate unduly large headstocks or housings This is especially true with respect to smaller size machine tools, such as small size turret lathes and the like.

An object of the present invention is to provide an improved and novel change speed transmission particularly adapted to be used in the headstock of a machine tool and capable of imparting a relatively large number of different speeds to the spindle or driven member, but which transmissoin at the same time is compact, utilizes relatively short shafts and enables the overall size of the headstock or transmission housing to be kept at a minimum.

It is desirable in most apparatus employing change speed transmission, and particularly with respect to the transmissoin employed in the headstock of machine tools that the transmission be silent in operation and such that the speeds can be changed under load easily and without danger of damaging the parts, and a further object of the present invention is to provide a change speed transmission which accomplishes the advantages referred to.

A further object is to provide a change speed transmission for a movable part, such as the work spindle of a lather, by which the movable part is operated at a large number of varying speeds by change speed gearing and clutches, said gearing remaining constantly in mesh thus avoiding the clashing of gears and enabling the speeds to be changed in a very efficient and comparatively silent manner.

A further object of the invention is to provide a change speed transmission particularly adapted for use in the headstock of a machine tool and which is so constructed that certain of the engageable and disengageable elements of the transmission may be simultaneously engaged to produce a braking action to the rotation of certain elements of the transmission and of the member which the transmission drives, such as the spindle, and which transmission can accomplish this without likelihood of damage to the parts and with the further advantage that special brake mechanism is eliminated and the function of such special brake mechanism is obtained through a predetermined operation of the change speed elements of the transmission.

A further object of the invention is to provide in a transmission particularly adapted for use in the headstock of a machine tool and such as referred to in the preceding objects, improved means for effecting the speed changes quietly and while under load and for effecting the braking of the member driven by the transmission as, for instance, the spindle, together with improved controls for said means.

A still further object is to provide in a transmission particularly adapted for use in the headstock of a machine tool and such as has been referred to in the preceding objects, improved control means for the transmission such that when the member driven by the transmission as, for example, the spindle, is rotating at a certain speed in one operative step in a work cycle a different speed therefor can be preselected for the next operative step and then readily obtained at the end of said one operative step.

An additional object is to provide in a transmission such as referred to in the last named object improved control means such that movement of said means in one direction effects preselection of the speeds and movement thereof in another direction obtains the preselected speed.

Further and additional objects and advantages not hereinbefore referred to will become apparent hereinafter during the detailed description of an embodiment of the invention which is to follow and which embodiment is illustrated in the accompanying drawings forming a part of this specification as applied to the headstock of a machine tool and wherein.

Figure 1:
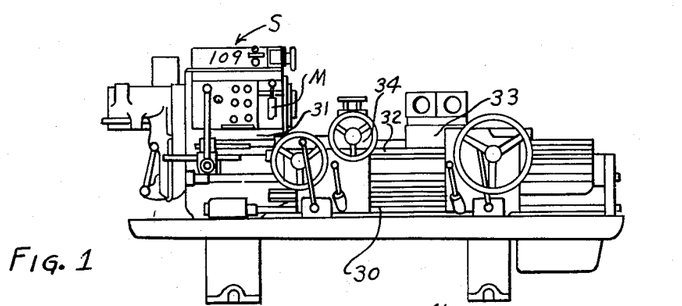
Fig. 1 is a front elevational view of a machine tool in the headstock of which is housed the change speed transmission and control therefore embodying the invention.

Referring to Fig. 1, the bed of the machine tool shown for illustrative purposes is indicated at 30 and at one end of the bed is the headstock 31. The bed is provided with parallel front and rear ways 32 which extend from the headstock toward the other end of the bed and upon which ways, in this instance the turret slide 33 and cross slide carriage 34, move toward and from the rotatable work spindle, later to be identified, which is mounted in the headstock 31 on an axis parallel to the ways 32 as is well understood in the art. Further description of the general features of the machine tool need not be explained in detail since they are well understood in the art and the invention is shown embodied therein for illustrative purposes since it could be used in other types of apparatus.

Figure 2:
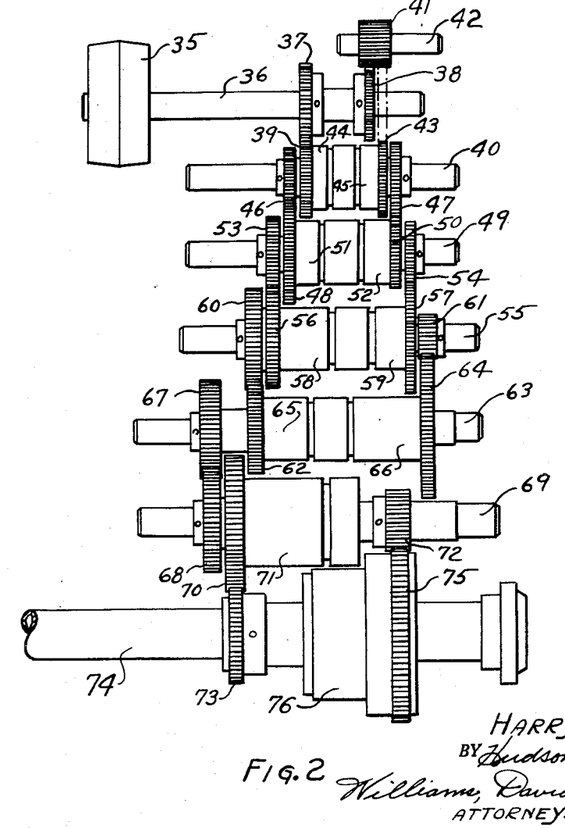
Fig. 2 is a developed elevational view of the change speed transmission embodying the present invention and illustrated as used in the headstock of the machine tool shown in Fig. 1.

The source of power for the change speed transmission in the headstock and which transmission and its control embody the present invention, may be any suitable source of power as, for instance, it may be an electric motor which drives a pulley 35 fixed to a power input shaft 36, see Fig. 2, as will be well understood in the art.

The power input shaft 36, in this instance, extends into and is rotatably supported in the headstock 31 by suitable bearings and has fixed to it within the headstock a forward drive gear 37 and a reverse drive gear 38. The forward drive gear 37 constantly meshes with a forward driven gear 39 freely rotatable on a forward and reverse driven shaft 40 rotatably supported in the headstock in suitable bearings as will be well understood.

The reverse drive gear 38 constantly meshes with an idler 41 mounted on a countershaft 42, suitably supported in the headstock as will be well understood in the art. The idler 41 constantly meshes with a reverse driven gear 43 freely rotatable on the forward and reverse driven shaft 40.

It will be understood that the driven gears 39 and 43 freely rotatable on the shaft 40 rotate in opposite directions. The forward driven gear 39 and the reverse driven gear 43 are connected to the forward and reverse driven shaft 40 to rotate the latter in opposite directions by means of a forward fluid pressure actuated friction clutch 44 and a reverse fluid pressure actuated friction clutch 45. Any suitable form of clutch of this type may be employed for the clutches 44 and 45 as, for instance, the hydraulically actuated friction clutches shown in the copending application of Harry Schoepe and Henry W. Spreitzer, Serial No. 260,408, filed December 7, 1951, now Patent No. 2,670,633, issued March 2, 1954.

It will also be understood that suitable conduit passages for the pressure fluid for actuating said clutches may be provided as, for instance, passages formed in the shaft 40, such as are shown in the shafts supporting this type of clutch in said copending application. However, disclosure of such details is omitted for simplicity, it being deemed sufficient to illustrate this arrangement only diagrammatically as in Fig. 3 since it will be well understood how pressure fluid can be conducted to and from the clutches to engage and release the same.

It will be understood that when the forward clutch 44 is engaged and the reverse clutch 45 is disengaged the shaft 40 will be rotated by the gear 39 in the forward direction. Conversely, when the clutch 45 is engaged and the clutch 44 is disengaged the shaft 40 will be rotated in the reverse direction by the gear 43.

Figure 3:
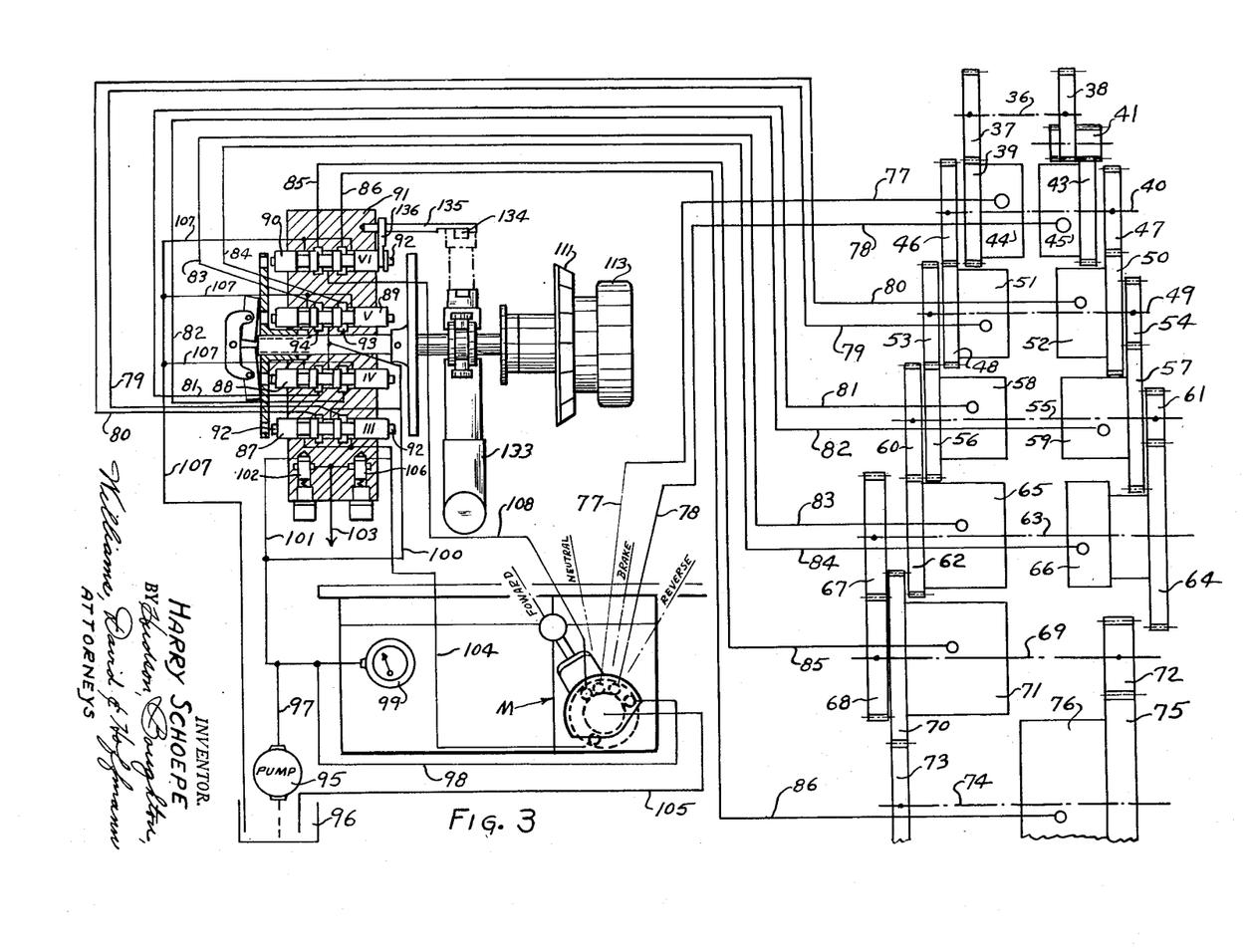
Fig. 3 is a diagrammatic view of the change speed transmission shown in Fig. 2 and of the fluid pressure control and operating circuits for the transmission including the main control valve shown in the "Forward" position and the speed selector valve with the latter being shown as a developed section with the slidable valve bodies thereof located in one of their two operative positions.

A gear 46 is fixed on the shaft 40 to the left of the forward driven gear 39 as viewed in Figs. 2 and 3 but closely adjacent to said gear 39. A second gear 47 is fixed on the shaft 40 to the right of the reverse driven gear 43, as viewed in Figs. 2 and 3 but closely adjacent to said gear 43. The gear 47 is larger than the gear 46. The gear 46 constantly meshes with a larger gear 48 that is freely rotatable on a first intermediate shaft 49 parallel to the shaft 40 and rotatably supported in suitable bearings in the headstock as will be well understood. It will be understood that the smaller gear 46 will drive the larger gear 48 at a reduced speed of rotation. The gear 47 fixed on the forward and reverse driven shaft 40 constantly meshes with a larger gear 50 freely rotatable on the first intermediate shaft 49, wherefore said gear 50 is driven at a lower speed of rotation by the gear 47.

Arranged on the first intermediate shaft 49 is a low speed fluid pressure actuated friction clutch 51. The clutch 51 when engaged operatively connects the gear 48 to the first intermediate shaft 49. Also arranged on the shaft 49 is a high speed fluid pressure actuated friction clutch 52 which when engaged operatively connects the gear 50 to the first intermediate shaft 49. Fixed on the first intermediate shaft 49 outwardly of and adjacent to the gear 48 is a gear 53. Also fixed on the shaft 49 but outwardly of and adjacent to the gear 50 is a gear 54 smaller than the gear 53.

A second intermediate shaft 55 is rotatably supported in the headstock in parallel relation to the first intermediate shaft 49 and has freely rotatable thereon a gear 56 which constantly meshes with the gear 53 and is larger than the gear 53, wherefore the gear 56 will be rotated by the gear 53 at a lower speed. Also freely rotatable on the second intermediate shaft 55 is a gear 57 that constantly meshes with the gear 54 and being larger than the gear 54 is driven thereby at a slower speed. A high speed fluid pressure actuated friction clutch 58 and a low speed fluid pressure actuated friction clutch 59 both on the second intermediate shaft 55 act when engaged to connect the gears 56 and 57, respectively, to the second intermediate shaft 55. A gear 60 is fixed on the shaft 55 outwardly of but adjacent to the freely rotatable gear 56 while a gear 61 likewise is fixed on the shaft 55 outwardly of and adjacent to the freely rotatable gear 57.

The gear 60 constantly meshes with a larger gear 62 freely rotatable on a third intermediate shaft 63 that is rotatable in suitable bearings in the headstock in parallelism to the other shafts previously referred to. The gear 62 being larger than the gear 60 consequently will be rotated thereby at a slower rate of speed than the gear 60. A gear 64 is freely rotatable on the third intermediate shaft 63 and is larger than the gear 61 with which it constantly meshes and hence the gear 61 rotates the gear 64 at a slower rate of speed. High speed and low speed fluid pressure actuated friction clutches 65 and 66 are mounted on the shaft 63 and when engaged operatively interconnect the gears 62 and 64, respectively, to said shaft. The third intermediate shaft 63 has a gear 67 fixed thereto outwardly of the gear 62.

The gear 67 constantly meshes with a gear 68 fixed on a fourth intermediate shaft 69 that is rotatably supported in suitable bearings in the headstock in parallelism to the previously mentioned shafts. Adjacent to the gear 68 but inwardly thereof there is a freely rotatable gear 70 on the fourth intermediate shaft 69 and this gear 70 is operatively interconnected to the shaft 69 selectively by means of a high speed fluid pressure actuated friction clutch 71 on the shaft 69. A gear 72 is fixed on the shaft 69 to the right of the clutch 71 as viewed in Figs. 2 and 3.

The freely rotatable gear 70 on the fourth intermediate shaft 69 constantly meshes with a smaller gear 73 that is fixed on the rotatable work spindle 74 of the machine tool. The freely rotatable gear 70 on the shaft 69 is larger than the gear 73 and consequently rotates said gear 73 and the work spindle at an increased rate of rotation.

clutch 71 or the clutch 76, depending upon the position of the valve body 90.

Figure 13:
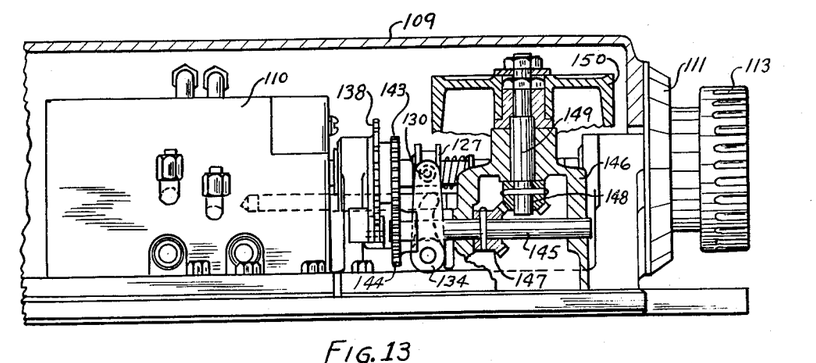
Fig. 13 is a longitudinal vertical sectional view through the outer housing of the speed selector or preselector valve; the indicator mechanism contained in said housing being shown in section while the portion containing the sliding valve bodies is shown in elevation.
Figures 14, 15:
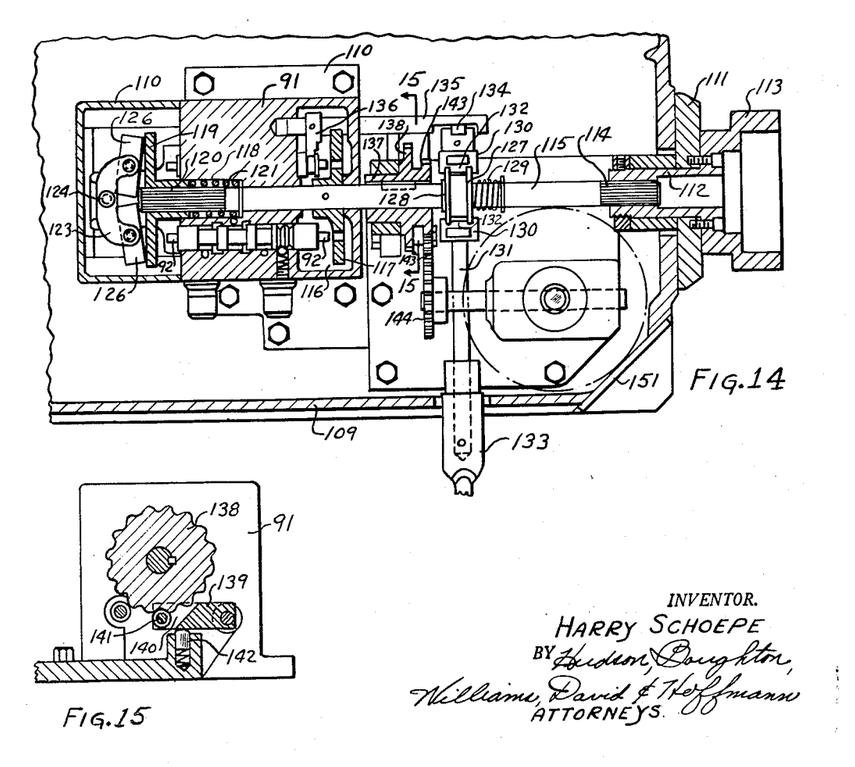
Fig. 14 is a longitudinal horizontal section through the speed selector or preselector valve and the indexing or speed selecting knob therefor and is taken substantially on line 14—14 of Fig. 17, looking in the direction of the arrows, the indexible speed selecting and valve actuating disks being shown in their maximum spaced apart indexing position.
Fig. 15 is a detail sectional view taken substantially on line 15—15 of Fig. 14, looking in the direction of the arrows.
Figures 16, 17, 18, 19, 20, 21, 22, 24:
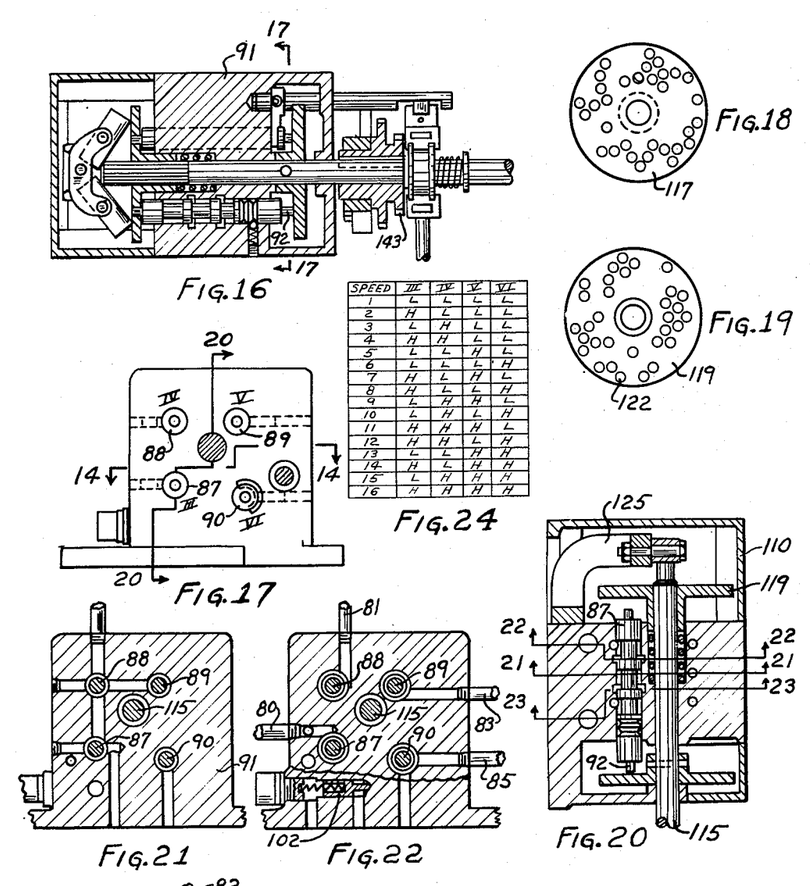
Fig. 16 is a sectional view similar to Fig. 14 but omitting certain parts of Fig. 14 and showing the operating shaft and the front and rear indexible speed selecting valve and actuating disks in their minimum spaced apart and valve actuating position.
Fig. 17 is a transverse vertical sectional view taken substantially on line 17—17 of Fig. 16, looking in the direction of the arrows.
Fig. 18 is a detached elevational view of the front indexible speed selecting and valve actuating disk of the speed selector or preselector valve with the indexed position of the disk as it would be for the No. 1 speed.
Fig. 19 is a view similar to Fig. 18 but shows the rear indexible speed selecting and valve actuating disk in the corresponding indexed position.
Fig. 20 is a detail sectional view through the speed selector or preselector valve and is taken substantially on line 20—20 of Fig. 17, looking in the direction of the arrows.
Fig. 21 is a sectional view taken substantially on line 21—21 of Fig. 20, looking in the direction of the arrows.
Fig. 22 is a sectional view taken substantially on line 22—22 of Fig. 20, looking in the direction of the arrows.
Fig. 24 is a chart showing the positions of the four two position slidable valve bodies in the speed selector or preselector valve for each of the sixteen speeds of the transmission and the pressure fluid actuated friction clutches in said transmission which are engaged in each instance.
Figure 23:
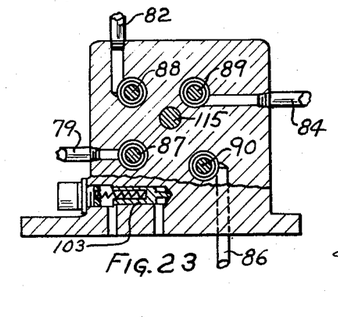
Fig. 23 is a sectional view taken substantially on line 23—23 of Fig. 20, looking in the direction of the arrows.

The speed selector valve indicated generally at S is mounted on top of the headstock 31, see Fig. 1, and comprises a main housing 109. The member 91 of the speed selector valve which contains the valve bores and the sliding valve bodies 87, 88, 89 and 90 is located within the main housing 109 and inside of an inner housing 110. (See Figs. 13 and 14.) The main housing 109 at one end thereof has a rotatable dial 111 mounted on an extended hub portion 112 of an operating knob 113 that is rigidly connected to the dial 111. The dial 111 bears graduation marks and indicia indicating different spindle speeds which can be selected or preselected when the knob and dial are turned.

The extended hub 112 of the knob passes through an opening in the end of the main housing 109 and is provided with a bore in which the splined end 114 of a selecting and actuating shaft 115 extends so as to rotate with the hub, knob and dial but to move axially relative thereto, a suitable space being provided within the hub 112 to accommodate the axial movement of the selecting or preselecting and actuating shaft 115.

The shaft 115 extends through the center of the member 91 around which center the valve bodies 87, 88, 89 and 90 are arranged as indicated in Figs. 17, 21, 22 and 23. The member 91 is provided with a hollow interior portion 116 and into this portion one end of the sliding valve bodies project.

A valve selecting and actuating disk 117 is fixed to the shaft 115 within the hollow interior portion 116 and said disk will be referred to as the front disk. The shaft 115 has its left hand end as viewed in the drawings extending through and beyond a counterbore 118 formed in the member 91 and said end of the shaft 115 has a splined connection with a rear valve selecting and actuating disk 119 which has a hub 120 that extends into and rotatably interfits the counterbore 118. A coil spring 121 surrounds the shaft 115 within the counterbore 118 and abuts one end of the counterbore and the end of the hub 120 of the rear disk 119 and functions normally to urge said disk 119 toward the left as viewed in the drawings.

The disks 117 and 119 are provided with a plurality of openings 122 and the openings on the disk 117 are correlated to the openings on the disk 119.

As will later be explained the disks are rotated to select or preselect a certain spindle speed and are then moved toward each other with an equalized movement to actuate particular valve bodies to shift the same in the proper direction to obtain the selected or preselected speeds. Consequently if certain of the valve bodies are to be shifted toward the left as viewed in the drawing then none of the openings 122 on the front disk 117 will be in alignment with the pins or projections 92 of said certain valve bodies. On the other hand, certain of the openings 122 of the rear disk 119 will be in alignment with the pins or projections 92 on the opposite ends of said certain valve bodies. Therefore when the disks 117 and 119 are moved toward each other the front disk 117 will engage the pins or projections 92 of the certain valve bodies that are to be shifted and shift said valve bodies toward the left while the pins or projections 92 on the opposite ends of said certain valve bodies will pass into openings 122 in the rear disk 119. Conversely if certain of the valve bodies are to be shifted toward the right, as viewed in the drawings, the movement of the rear disk 119 toward the front disk 117 will cause the rear disk to contact the pins or projections 92 at the left hand end of the certain valve bodies to shift said bodies toward the right while the pins or projections 92 on the opposite ends of the said valve bodies are in registration with openings 122 in the front disk 117 and will pass into said openings.

It will be recalled that the valve bodies 87, 88, 89 and 90 are two-position valves and shifting movement toward the left as viewed in the drawings moves them to one operative position while shifting movement toward the right moves them to the other operative position. The valve bodies are held in either operative position by spring detents. Axial movement of the shaft 115 effects movement of the front disk 117 toward the pins or projections 92 on the adjacent ends of the shiftable valve bodies. However, the rear disk 119 is normally maintained spaced from the projections 92 on the other end of the shiftable valve bodies by the spring 121, it being recalled that there is a splined connection between the hub 120 of the rear disk 119 and the shaft 115. Therefore in order to move the rear disk 119 toward the adjacent ends of the shiftable valve bodies and toward the front disk 117 when the shaft 115 is shifted axially toward the left as viewed in the drawing the following arrangement is employed:

A substantially U-shaped member 123 is pivotally mounted in the inner housing 110 on a pivot 124 located midway of the U-shaped member 123 and carried by a suitable support 125 in the housing. The pivot 124 is located in line with the axial center of the shaft 115 and to the left of the left hand end of said shaft as viewed in Figs. 3 and 14. Identical lever arms 126 are symmetrically pivoted midway of their ends to the ends of the U-shaped member 123. The outer ends of the lever arms 126 bear against the rear disk 119, the spring 121 acting to normally maintain the disk 119 in engagement with the outer ends of said lever arms. The inner ends of the lever arms 126 engage the end of the shaft 115 and it will be seen that when said shaft 115 is moved toward the left as viewed in the drawings the end of said shaft due to the splined connection between the shaft and the hub 120 of the disk 119 will rock the lever arms 126 so that their outer ends press against the disk 119 and move the latter toward the right and against the action of the spring 121. Consequently it will be seen that movement of the shaft 115 causes the front and rear disks 117 and 119 to move simultaneously toward each other with an equalized movement. This movement of the disks toward each other acts to shift the valve bodies either toward the left or toward the right depending upon the locations of the openings 122 in the disks.

A shoe ring 127 is slidable on the shaft 115 and is held normally against a fixed shoulder 128 on the shaft by a preloaded compression spring 129. A double armed lever 130 is fixed to a rock shaft 131 that is supported in the housing 109 of the speed selector valve and extends at right angles to and below the rotatable and endwise shiftable shaft 115. The two-armed lever 130 mounts at the ends of its arms shoes 132 which project into the groove of the shoe ring. The rock shaft 131 extends outwardly of the housing at the front of the headstock and has mounted thereon an operating handle 133. It will be seen that rocking of the handle 133 in an anticlockwise direction moves the shoe ring 127 toward the left with a resultant movement of the shaft 115 in that direction since the shoe ring is engaging the fixed shoulder 128 on the shaft 115. This movement of the handle 133 thus causes the disks 117 and 119 to move toward each other to shift the valves in accordance with the speeds selected or preselected when the knob 113 and shaft 115 were indexed.

The rock shaft 131 at its end and beyond the location of the double arm lever 130 has secured thereto a single arm lever 134, the upper end of which is located in a notch formed in a shift rod 135 and which notch extends longitudinally of the rod. The shift rod 135 is slidably supported in the member 91 and has fixed to it a yoke 136 which straddles and engages in an annular groove formed in the right hand end of the valve body 90 as viewed in Figs. 3 and 14.

It will be seen that when the handle 133 is rocked in an anti-clockwise direction the movement of the single arm lever 134 imparts no movement to the shift rod 135 due to the lost motion between the lever 134 and the left hand end of the slot in the shift rod 135. However, when the handle 133 is rocked in a clockwise direction the shoe ring 127 moves on the shaft 115 and compresses the spring 129 without imparting endwise movement to the shaft 115. At this time, however, the single arm lever 134 moves the shift rod 135 toward the right to impart similar movement to the valve body 90 to shift the valve body 90 from its left hand operative position as viewed in Fig. 3 wherein the high speed clutch 71 on shaft 69 is engaged to its right hand operative position wherein the low speed clutch 76 on the spindle 74 will be engaged so that a low speed range can be imparted to the spindle through the transmission all as will be more fully explained hereinafter. The clockwise rocking of the handle 133 and shaft 131 provides for the shifting of the valve body 90 independently of the selecting or preselecting mechanism for the purpose just referred to.

A hub 137 is keyed on the shaft 115 intermediate the shoulder 128 and the member 91 and this hub has mounted thereon either integral or rigid therewith a detent wheel 138. A lever arm 139 is pivoted at one of its The gear 72 that is fixed on the fourth intermediate shaft 69 constantly meshes with a larger gear 75 that is freely rotatable on the spindle 74 and which is rotated by the gear 72 at a slower rate of speed. A low speed fluid pressure actuated friction clutch 76 is mounted on the spindle 74 and when engaged operatively connects the gear 75 to the spindle.

From the foregoing description it will be apparent that the change speed transmission can impart to the spindle 74 from the power input shaft 36 sixteen different speeds of rotation in either the forward or reverse direction.

It will be noted that the arrangement of the shafts, clutches and gearing is such that the change speed transmission is compact and can be contained in a headstock or housing of relatively small size notwithstanding the fact that the transmission provides for imparting to the driven member, i. e., the work spindle, sixteen different speeds.

As will be pointed out later, certain of the clutches in the transmission can be simultaneously engaged to provide a braking arrangement for the rotating spindle and such arrangement requires no additional brake mechanism and is perfectly safe in that the clutches being friction clutches provide the necessary slippage in case of overload.

Also, it will later be pointed out, that by simultaneously disengaging certain of the clutches in the transmission and particularly the clutches on the fourth intermediate shaft 69 and the spindle 74 a neutral arrangement of the transmission can be obtained and one wherein the spindle 74 is a free spindle as is often desired in the operation of a machine tool.

The clutches referred to herein as fluid pressure actuated friction clutches might be operated electrically or mechanically, although in the preferred embodiment they are shown as actuated by fluid pressure. It will be understood that the clutches referred to herein are similar in construction to the clutches shown and described in said Schoepe and Spreitzer Patent No. 2,670,633 and that suitable provision is made for conducting the pressure fluid to and from said clutches as, for instance, the arrangements of conduits in the various shafts similar to the arrangements shown in said Patent No. 2,670,633.

Reference to Fig. 3 discloses that the forward and reverse clutches 44 and 45 on the forward and reverse driven shaft 40 are connected, respectively, to the main control valve M, later to be referred to, by fluid pressure conduits 77 and 78. The low speed clutch 51 and the high speed clutch 52 on the first intermediate shaft 49 are connected, respectively, to the speed selector or preselector valve S, later to be described, by fluid pressure conduits 79 and 80.

The high speed clutch 58 and the low speed clutch 59 on the second intermediate shaft 55 are connected, respectively, to the speed selector or preselector valve S by fluid pressure conduits 81 and 82. The high speed clutch 65 and the low speed clutch 66 on the third intermediate shaft 63 are connected, respectively, to the speed selector or preselector valve S by pressure fluid conduits 83 and 84. The high speed clutch 71 on the fourth intermediate shaft 69 is connected to the speed selector or preselector valve S by a fluid pressure conduit 85. The low speed clutch 76 on the work spindle or driven member 74 is connected to the speed selector or preselector valve S by a pressure fluid conduit 86.

The speed selector or preselector valve S contains four valve cavities or bores in each of which slides a cylindrical valve body having two operative positions. The fluid pressure conduits 79 and 80 from the low and high speed clutches 51 and 52 on the first intermediate shaft 49 extend to the cavity containing the sliding valve body 87 (see Fig. 3). The fluid pressure conduits 81 and 82 communicating with the high and low clutches 58 and 59 on the second intermediate shaft 55 extend to the cavity containing the sliding valve body 88. The pressure fluid conduits 83 and 84 to the high and low speed clutches 65 and 66 on the third intermediate shaft 63 extend to the cavity in which the sliding valve body 89 is located. The pressure fluid conduits 85 and 86 from the high speed clutch 71 on the fourth intermediate shaft 69 and from the low speed clutch 76 on the spindle 74 extend to the cavity in which the sliding valve body 90 is located.

Each of the four cylindrical valve bodies 87, 88, 89 and 90 is of a length such that both of its ends project beyond the opposite ends of the valve cavity or beyond and outwardly of the opposite sides of the member 91 of the speed selector or pre-selector valve S that contains the four valve cavities. Each valve body on its opposite ends is provided with a centrally located pin or projection 92 of reduced diameter as compared to the diameter of the valve body and for a purpose later to be explained, see Figs. 3, 14, 16 and 17. Each valve body 87, 88, 89 and 90 is a two-position valve and has adjacent its opposite ends cylindrical portions that slidably interfit the valve cavity or bore and intermediate its opposite ends spaced lands that also slidably interfit the valve cavity or bore. Each valve body intermediate the said spaced lands and intermediate each land and the adjacent end of the valve body has portions of reduced diameter so as to provide annular spaces between the valve body and the valve cavity or bore and which annular spaces are spaced apart longitudinally of the valve body and its cavity or bore.

Each valve cavity or bore is provided with annular chambers 93 and 94 spaced longitudinally of the valve bore and concentric therewith but of greater diameter. The fluid pressure conduits 79 and 80 extend to and communicate with the annular chambers 93 and 94 respectively of the valve bore in which the valve body 87 is slidably mounted. The fluid pressure conduits 81 and 82 extend to and communicate with the annular cavities 94 and 93, respectively, of the the valve bore in which the valve body 88 is slidably mounted. The fluid pressure conduits 83 and 84 extend to and communicate with the annular cavities 94 and 93, respectively of the valve bore in which the valve body 89 is slidably mounted. The fluid pressure conduits 85 and 86 extend to and communicate with the annular cavities 94 and 93 of the valve body in which the valve body 90 is slidably mounted.

In order to complete at this time the fluid pressure circuits to the valves 87, 88, 89 and 90 the source of supply of the fluid pressure system should be described. This system comprises a pump 95 which may be driven from the main motor of the machine tool or it may be driven from a separate motor as will be well understood. The pump 95 has its intake communicating with a sump 96. The fluid pressure line from the output side of the pump 95 is indicated at 97 and this line is connected by a conduit 98 to the main control valve later to be referred to and also it may be connected to a pressure gauge 99. The line or conduit 97 is connected to an input conduit 100 which extends to and communicates with the valve bores for the valves 87, 88 and 89 intermediate the annular chambers 93 and 94 of said valve bores. The conduit 97 is also connected by a conduit 101 to a pressure relief valve 102 mounted in the member 91 of the speed selector valve and connected in turn to the sump 96 by a drain line 103 as will be well understood in the art.

The bore for the valve body 87 has communicating with it at opposite sides of the annular chambers 93 and 94 a fluid pressure conduit 104 that extends to the main control valve later to be described and which conduit 104 is connected to a drain line 105 extending from the main control valve to the sump when the main control valve is in every position except brake position. When the main control valve is in brake position the conduit 104 will then be connected to the input conduit 98 of the main control valve as will later be explained so that pressure fluid is applied to both conduits 79 and 80, wherefore both clutches 51 and 52 on the shaft 49 will be engaged to produce a braking action that will be more fully explained hereinafter. The conduit 104 is connected also to a pressure relief valve 106 mounted in the member 91 of the speed selector valve and communicating in turn with the drain conduit 103 that is connected to the first mentioned pressure relief valve 102.

The bores in which the valve bodies 88 and 89 slide communicate outwardly of the annular chambers 93 and 94 with a drain conduit 107 that extends to the sump. This drain conduit 107 also communicates with the bore in which the valve body 90 slides and outwardly of the annular chambers 93 and 94 as clearly shown in Fig. 3. A pressure fluid conduit 108 communicates with the bore for the valve body 90 intermediate the annular chambers 93 and 94 and extends to the main control valve later to be described.

As will later be pointed out when the main control valve is in neutral position the conduit 108 will be connected through the main control valve to drain in order that the clutches 71 and 76 can both be simultaneously released, but in other positions of the main control valve the conduit 108 will be connected through the main control valve to the conduit 98 and hence will constitute at such times a fluid pressure supply conduit for engaging either the ends to a bracket support within the selector valve housing while its opposite end is cut away as indicated at 140 and mounts a detent roller 141. A spring-pressed plunger 142 slidably carried by the housing of the selector valve engages the underside of the lever arm 133 and acts to maintain the roller 141 in one of the circumferential depressions of the detent sprocket 138, thus exerting frictional resistance to the rotation of the shaft 115 so as to maintain the said shaft in the different rotative position to which it may be indexed in the selecting or preselecting of a desired speed.

The hub 137 intermediate the sprocket 138 and the shoulder 128 has fixed or secured to it a gear 143 which constantly meshes with an idler gear 143a which constantly meshes with a gear 144 fixed on a shaft 145 that is rotatably supported in the housing 109 by means of bearing openings in a bracket 146. The shaft 145 extends parallel to the shaft 115 and has fixed to it within the bracket 146 a bevel gear 147 that constantly meshes with a bevel gear 148 fixed on the lower end of a vertically extending shaft 149 that is rotatably supported by the bracket 146 and has fixed to it above the bracket 146 an indicating drum 150. The drum 150 is thus driven by the shaft 115 with a one to one ratio.

It will be seen that indexing of the shaft 115 by the knob 113 to select or preselect a particular speed imparts through the gears 143, 143a and 144 rotation to the shaft 145 which, in turn, through the bevel gears 147 and 148, rotates the vertical shaft 149 to index the drum 150. The drum 150 bears indicia indicating the different speeds of the movable member or spindle and said indicia can be observed by the operator through the window 151 formed at the front side of the housing 109 for the speed selector valve.

Figures 4, 8:
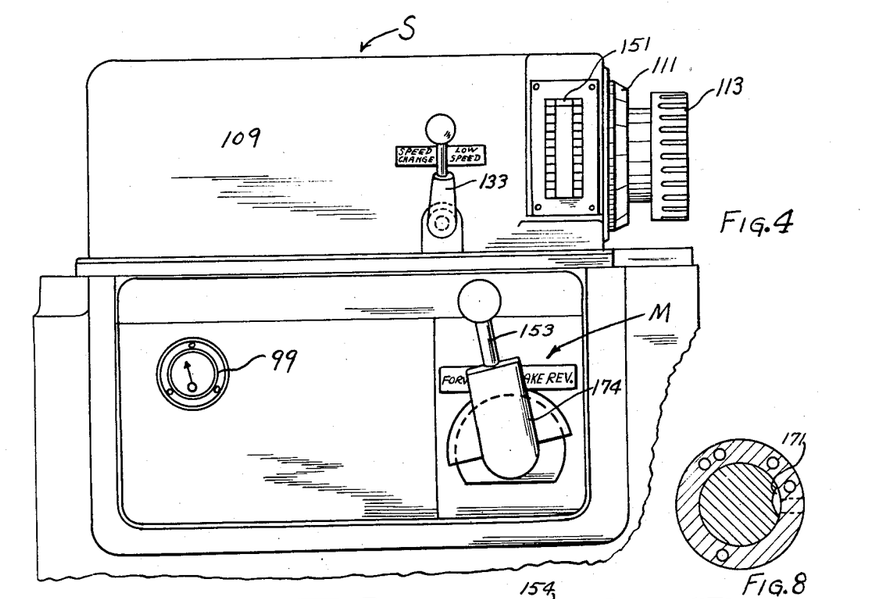
Fig. 4 is a fragmentary front elevation on an enlarged scale of that portion of the headstock of the machine tool shown in Fig. 1 wherein are located the main control lever (shown in the "neutral" position), the indexing knob for the speed selector or preselector valve and the actuating lever for said speed selector or preselector valve and which portion of the headstock houses the main control valve and the speed selector or preselector valve.
Figs. 7, 8, 9, 10, 11 and 12 are transverse sectional views through the main control valve and are taken, respectively, on lines 7—7, 8—8, 9—9, 10—10, 11—11 and 12—12 of Fig. 5 looking in the direction of the arrows.

The main control valve is indicated generally at M, see Figs. 1, 3 and 4. As already stated, the pressure line conduit 98 extends to the main control valve. This main control valve comprises a rotatable valve body 151 mounted adjacent the front of the headstock and provided with a forwardly extending shaft portion 152 to the outer end of which is connected an operating lever 153 conveniently located on the front of the headstock. The main control valve M has its drain port connected to the sump by the conduit 105 as already briefly stated.

Referring particularly to Figs. 5 to 12 inclusive a detailed description of the main control valve M will now be set forth, it being recalled that the valve is in the neutral position in these views. The rotatable valve body 151 is located in a valve housing 154 and it is secured within the headstock at the front of the machine and the forwardly extending shaft 152 on the body 151 extends through an opening to the front of the machine and is rotatably supported in a boss formed on the front wall of the headstock, see Fig. 5.

Figures 5, 6, 7, 9, 10, 11, 12:
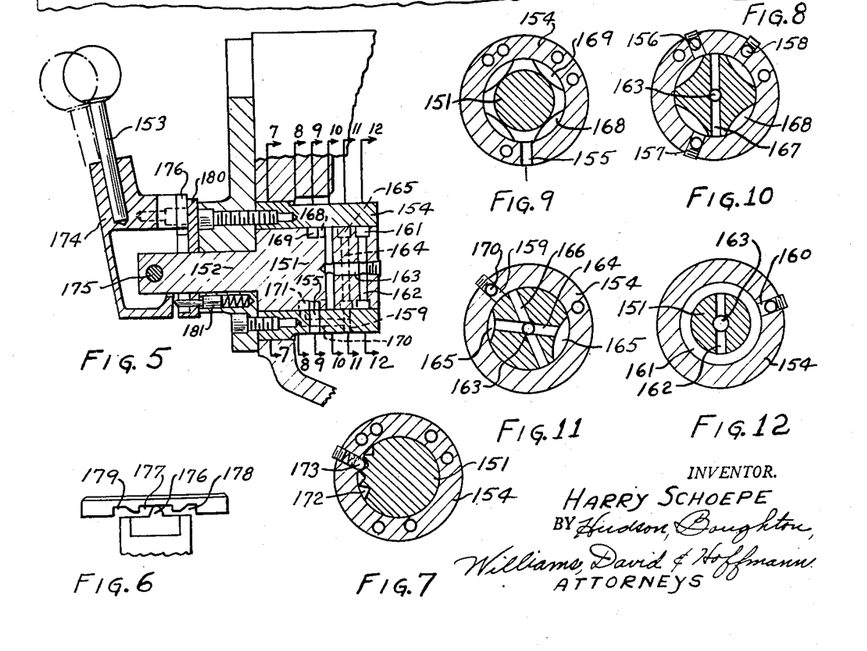
Fig. 5 is a longitudinal section through the main control valve taken in the "Neutral" position thereof and indicates by full lines the position of the actuating lever therefor wherein it is locked against undesired swinging movement and by dot and dash lines its position wherein it can be swung and the main control valve rotated or rocked on its axis.
Fig. 6 is a fragmentary plan view of a portion of the actuating lever for the main control valve and shows an arrangement for limiting its rocking movement when in the full line position of Fig. 5.

The valve casing or housing 154 is provided with a passage 155, see Fig. 9, that communicates with the valve chamber and to which passage the drain conduit 105 is connected. The valve housing or casing 154 is provided with three passages 156, 157 and 158, see Fig. 10, communicating with the valve chamber and connected, respectively with the conduits 77, 104 and 78 which extend to the forward clutch 44 on shaft 40, to the valve chamber in which the valve body 87 of the selector valve is mounted, and to the reverse clutch 45 on shaft 40.

The valve casing or housing 154 is provided with a passage 159 communicating with the valve chamber and connected to the conduit 108 which extends to the valve cavity having therein the valve body 90 of the speed selector or preselector valve S and functions in the neutral position of the main control valve for obtaining the "free" spindle, see Fig. 11.

The valve housing or casing 154 further is provided with a passage 160, see Fig. 12, which communicates with the valve chamber and is connected to the pressure supply line or conduit 98. The valve body 151 is provided with a circumferential groove 161, see Figs. 5 and 12, which is always in communication with the passage 160 and the pressure supply line 98. The valve body 151 has a diametrically extending passage 162 communicating at its opposite opposite ends with the groove 161 and at its midpoint with a centrally located bore 163 that extends axially of the valve body toward the front of the headstock.

The valve body 151 in the transverse plane thereof indicated in Fig. 11 is provided with a diametrically extending passage 164 which communicates intermediate its ends with the axial bore 163 while its opposite ends terminate in enlarged recessed or scalloped portions 165 formed in the circumference of the valve body. The valve body in this plane is also provided with a diametrically extending passage 166 displaced a predetermined angle with respect to the passage 164.

In the transverse plane of the valve body shown in Fig. 10 said body is provided with a diametral passage 167 which communicates with the axial bore 163. Also the valve body in this plane is provided on its circumference with a plurality of axially extending circumferentially elongated concavities or grooves 168, there being four such grooves provided as clearly shown in Fig. 10. The grooves 168 extend axially of the valve body toward the front of the headstock in the plane indicated in Fig. 9 and communicate with a circumferential groove 169 formed in the valve body and always in communication with the drain passage 155 in the valve housing or casing and which passage it will be recalled is connected to the drain conduit 105.

The passage 159 shown in Figs. 5 and 11 is connected intermediate its ends to a passage 170 formed in the valve casing or housing 154 and extending axially thereof toward the front of the headstock and provided at its forward end with an angle portion communicating with the valve chamber. The said angle portion of the passage 170 in the neutral position of the valve body registers and communicates with a passage 171 formed in the valve body and extending to the circumferential groove 169 that is always connected to the drain conduit 155. It will be seen that in all positions of the valve body except neutral position the passages 170 and 171 are out of communication with each other and said passage 170 at such times is dead-ended by the valve body.

Referring to Fig. 7 it will be seen that the valve body 151 is provided on its circumference near the front of the headstock with an arcuate series of notches 172 in which engage a spring detent 173 formed of a spring-pressed ball carried by the casing or housing 154. The detent 173 engaging in the notches 172 functions to frictionally hold the valve body 151 in the various operative positions to which it is turned.

The operating lever 153 is carried by a connecting member 174 that is pivotally connected at 175 to the outer end of the forward extension of shaft 152 of the valve body 151, the axis of said pivotal connection extending transversely to the axis of rotation of the valve body 151. It will be seen that the handle 153 can be rocked about the axis of the valve body 151 to rotate the latter and also can be swung transversely of the axis of the valve body 151 toward and away from the front of the headstock.

The connecting member 174 has mounted or formed thereon a lug 176 projecting toward the headstock and said lug is adapted to engage in an elongated recess 177 or in two shorter recesses 178 and 179 located at the opposite ends of the recess 177 and all of said recesses being formed in a keeper plate 180 secured to the front of the headstock, see Figs. 5 and 6.

The connecting member 174 is normally rocked about the pivot 175 to the full line position of Fig. 5 by a spring-pressed plunger 181 mounted in the boss of the headstock through which the shaft 152 extends and engaging the lower end of the member 174. The spring-pressed plunger 181, as stated, normally maintains the member 174 in the full line position shown in Fig. 5 with the lug 176 extending into one or the other of the recesses 177, 178 and 179.

The elongated central recess 177 is provided with right angled shouldered ends, wherefore the lever 153 and the member 154 must be rocked outwardly from the full line position of Fig. 5 to the dot and dash line position thereof to disengage the lug 176 from the recess 177 in order to swing the handle or lever 153 and the member 174 about the axis of rotation of the valve body 151, if the movement of the valve body desired is from neutral or brake position into forward or reverse position.

It will be noted that the recess 177 is of such length as to include the neutral and brake positions so that it is unnecessary to swing the lever 153 outwardly if the main control valve is to be rocked from neutral to brake or vice versa. It will further be noted that the recesses 178 and 179 adjacent to the central recess 177 are provided with inclined ends, wherefore if the main control valve is in either the forward or reverse positions and the lug 176 is in the recess 179 or 178 the operator merely rocks the control lever and the valve body 151 in the direction to move the valve body out of forward or reverse position and into neutral position. This last mentioned rocking movement causes the lug 176 to move up on the inclined ends of the recesses 178 and 179 as the case may be and thus rock the lever 153 and member 174 about the pivot 175.

Assuming that the lever 153 is in neutral position as shown in Figs. 4 to 12 inclusive, the high speed clutch 71 on the shaft 69 and the low speed clutch 76 on the spindle 74 will both be disengaged at such time and the spindle will be a free spindle.

This situation exists since the conduit 86 from the clutch 76 will be connected to the drain line 107 provided the valve body 90 is in the position shown in Fig. 3. Also at this time the conduit 85 from the clutch 71 will be connected to conduit 108 which extends to passage 159 in the housing or casing 154 of the main control valve. The passage 159 is dead-ended against the valve body 151, see Fig. 11, but said passage 159 communicates with the passage 170 that extends longitudinally of the valve casing or housing 154 and is connected in turn to the passage 171 in the valve body 151 which extends to the annular groove 169 that is connected in turn to the passage 155 in the valve casing or housing of the main control valve and which latter passage communicates with the conduit 105 that extends to drain. Consequently both clutches 71 and 76 are connected to drain in the neutral position of the main control valve.

It will be understood that if the valve body 90 of the selector valve S is in the other of its two operative positions than the one shown in Fig. 3 then conduit 86 will be connected to drain through conduit 108 while conduit 85 will be connected to drain through the conduit 107. Also in the neutral position of the main control valve the conduit 77 from the forward clutch 44 and the conduit 78 from the reverse clutch 45 will be connected, respectively, to the passages 156 and 158 in the casing 154 of the main control valve and as shown in Fig. 10 the passages 156 and 158 communicate with two of the concavities 168 in the valve body 151 and which cavities extend axially of the valve body 151 to and communicate with the circular groove 169 in the valve body 151 and which groove is always in communication with the drain passage 155 that is connected to the conduit 105. Hence in the neutral position of the main control valve the forward and reverse clutches are both disengaged and are connected to drain.

Also in the neutral position of the main control valve one or the other of the clutches 51 and 52 on the shaft 49 is connected to drain through the conduit 104 that extends to the passage 157 in the casing or housing 154 of the main control valve and which passage 157 communicates with another of the concavities 168, see Fig. 10. Of course at this time one or the other of the clutches 51 and 52 on the shaft 49 will be engaged, since the pressure supply conduit 100 will be supplying fluid pressure to such one or the other clutch as, for instance referring to Fig. 3, the clutch 52 through the conduit 80.

Assuming that the main control valve is in neutral position while the speed selector valve has been set in the positions of the sliding valve bodies shown in Fig. 3, then movement of the main control valve from neutral position to forward position accomplishes the following result: The diametral passage 167 in the body 151 of the main control valve is now connected with the passage 156 which communicates with conduit 77 and hence pressure fluid flows to the forward clutch 44 on the shaft 40 to engage said clutch. At this time the reverse clutch 45 remains connected to drain through the conduit 78, passage 158, recess 168, annular groove 169 and drain passage 155. At this time the high speed clutch 52 on shaft 49 is engaged, since the conduit 80 extending from said clutch is connected through the valve body 87 with the pressure supply conduit 100. Also at this time the low speed clutch 51 on shaft 49 is disengaged and is connected through the conduit 79 with drain by way of the conduit 104, the main control valve and conduit 105. Also at this time the high speed clutch 58 on shaft 55 is engaged being connected through conduit 81 with the pressure supply conduit 100. However, the low speed clutch 59 on shaft 61 is disengaged and is connected to drain through the conduit 82 and drain conduit 107. At this time the high speed clutch on shaft 63 is engaged and is connected through conduit 83 to the pressure supply line 100 by way of valve body 89.

It will be understood that the low speed clutch 66 on shaft 63 is disengaged and is connected by way of conduit 84 through the valve body 89 to drain conduit 107. The movement of the main control valve from neutral to forward position has connected the diametral passage 166 in the body 151 of the main control valve with the passage 159 in the casing of said valve and which passage 159 is connected to the conduit 108 that now becomes the pressure supply conduit so that pressure fluid flows through the main control valve, conduit 108, around valve body 90 and through conduit 85 to engage the high speed clutch 71 on shaft 69. At this time the low speed clutch 76 on the spindle 74 is disengaged and is connected to drain through the conduit 86 around valve body 90 and conduit 107.

It will thus be seen that the spindle 74 will be driven in the forward direction at the desired speed which has been selected or preselected and wherein the valve bodies 87, 88, 89 and 90 will be in the positions shown in Fig. 3.

Now assuming that it is desired to change the spindle speed the operator turns the knob 113 until the dial 111 or the indicator 151 shows that the disks 117 and 119 have been indexed to the desired position for the speed that is wanted. This indexing of the disks may take place while the machine is operating in one operative step of a work cycle to preselect the spindle speed for the following operative step or it may take place after the first operative step has been completed and prior to initiating the second operating step in order to select the desired spindle speed.

When the first operative step has been completed the operator rocks the handle 133 in a counterclockwise direction to cause the disks 117 and 119 to move toward each other to shift certain of the valve bodies 87, 88, 89 and 90 to obtain the new spindle speed. It will be understood that the shifting of the valve bodies will cause certain of the fluid pressure actuated friction clutches to be engaged and others thereof to be disengaged as the case may be and in accordance with the setting of the two-position valve bodies in the speed selector valve. The mode of operation just referred to is followed for the different operative steps in a work cycle and it will be recalled that any one of sixteen different speeds can thus be obtained.

If it is desired to drive the spindle in reverse the operator moves the control lever 153 of the main control valve outwardly about the axis 175 and then rocks the control lever to reverse position. This causes the diametral passage 167 of the valve body of the main control valve to be in communication with the passage 158 which in turn is connected by the conduit 78 to the reverse clutch 75. At this time the passage 156 which is connected through the conduit 177 with the forward clutch 44 is connected to drain through the main control valve. Of course the different spindle speeds can be selected or preselected for reverse operation in the same manner as hereinbefore explained with respect to forward operation.

If it is assumed that valve body 87 of the speed selector valve is in the position shown in Fig. 3 then conduit 80 is connected to the pressure supply line 100 and the high clutch 52 on shaft 49 is engaged when the main control valve is in either forward or reverse positions. Under these circumstances if the main control valve is rocked by its control handle to brake position then conduit 104 is connected through the main control valve to the fluid pressure supply line 98 and since conduit 104 extends to the valve cavity in which the valve body 87 slides, as indicated in Fig. 3, then conduit 79 will also be connected to fluid pressure supply and hence the low clutch 51 on shaft 49 will be additionally engaged, wherefore shaft 49 will be substantially locked against rotation and will impart a braking action to the transmission, it being recalled that the friction clutches utilized enable this braking action to be obtained without danger to the transmission. Of course when the main control valve is in brake position forward clutch 44 and reverse clutch 45 are both disengaged.

It will also be seen that if the valve body 87 is in the other of its two operative positions from the one shown in Fig. 3 then when the main control valve is in brake position the conduit 104 will be connected to the conduit 80 so that the clutch 52 will be engaged simultaneously with the clutch 51 on the shaft 49.

It will be seen that the arrangement just described provides for braking the transmission and stopping the coasting thereof to rapidly stop the rotation of the transmission and spindle.

Assuming it is desired to operate the spindle for threading purposes, then the operator moves the lever 133 clockwise or to the right, as viewed in Fig. 4, to shift the valve body 90 independently of the selective or preselective valve to momentarily engage the low speed clutch 76 on the spindle and disengage the high speed clutch 71 on shaft 69. The operator holds the lever 133 in the shifted position referred to until the threading operation has been completed whereupon he rocks said lever in a counterclockwise direction to bring the disks 117 and 119 inwardly toward each other again to actuate the valve body 90 to its position wherein high speed clutch 71 on shaft 69 is engaged and low speed clutch 76 on the spindle is disengaged. Simultaneously he reverses the direction of rotation of the spindle by manipulating the main control valve so that the tap or die will back off from the work at high speed.

Although a preferred embodiment of the invention has been illustrated and described herein it will be understood that the invention is susceptible of various modifications and adaptations within the scope of the appended claims.

Having thus described my invention, I claim:

1. In a change speed transmission adapted to be used in a machine tool headstock having a power input shaft and a rotatable driven member such as a work spindle; a plurality of rotatable shafts intermediate said input shaft and said driven member; an unbroken gear train carried by said input shaft, said intermediate shafts and said driven member and including freely rotatable gears on said intermediate shafts and said driven member, and power actuated clutches on said intermediate shafts and said driven member for connecting said freely rotatable gears thereto; a control device for said clutches comprising a plurality of endwise movable control members each having two operative positions and each controlling two of said clutches and each having on its opposite ends a longitudinally extending pin, a pair of normally axially spaced disks each provided with a plurality of openings correlated in position relative to said pins, means for indexing said disks to position certain of said openings in alignment with certain of said pins and other of said openings out of alignment with other of said pins to select or preselect a certain speed for said driven member, and means for moving said disks axially toward each other to cause certain of said pins to engage one or the other of said disks and other of said pins to pass into the openings in said disks to endwise shift certain of said control members to effect engagement or disengagement of certain of said clutches to obtain the selected or preselected speed.

2. In a change speed transmission as defined in claim 1, means for visibly indicating a selected or preselected speed of said driven member, and means providing an operative connection between said indicating means and said indexing means for actuating said indicating means in timed relationship with the movement of the indexing means.

3. In a change speed transmission as defined in claim 1 and wherein said clutches are pressure fluid actuated and said control members are endwise shiftable valve bodies.

4. In a change speed transmission as defined in claim 1 and wherein said means for moving said disks axially toward each other includes mechanism for imparting equalized movement to said disks.

5. In a change speed transmission as defined in claim 1 and wherein said control device includes means for moving one of said control members endwise in one direction and independently of its endwise movement by said disks.

6. In a change speed transmission as defined in claim 1 and wherein said disks are mounted on an indexible and endwise movable shaft, while said control members move parallel to said shaft and are spaced around said shaft.

7. In a change speed transmission as defined in claim 6, a movable indicating means, and means providing an operative connection between said indexible shaft and said indicating means for moving the latter in predetermined timed relationship with the former thereby indicating the positions of said control members.

8. In a change speed transmission as defined in claim 6 and wherein said control members are spaced around said indexible and endwise movable shaft with the individual control members located at different radial distances from the axis of said shaft.

9. In a change speed transmission as defined in claim 6 and wherein said indexible and endwise movable shaft has a fixed connection with one of said disks and a splined connection with the other of said disks, while means actuated by said shaft during its endwise movement in one direction has an operative connection with said other disk to move the latter axially in the opposite direction and toward the one disk that is fixed to said shaft.

10. A control device for a plurality of power actuated clutches in a change speed transmission and comprising a plurality of endwise movable control members each having two operative positions and each controlling two of said clutches and each having on its opposite ends a longitudinally extending pin, a pair of normally axially spaced disks each provided with a plurality of openings correlated in position relative to said pins, means for indexing said disks to position certain of said openings in alignment with certain of said pins and other of said openings out of alignment with other of said pins to select or preselect engagement or disengagement of certain of said clutches, and means for moving said disks axially toward each other to cause certain of said pins to engage one or the other of said disks and other of said pins to pass into the openings in said disk to endwise shift certain of said control members to effect engagement or disengagement of certain of said clutches.

11. In a control device as defined in claim 10 and wherein the clutches are pressure fluid actuated and said control members are endwise shiftable valve bodies.

12. In a control device as defined in claim 10 and wherein said means for moving said disks axially toward each other includes mechanism for imparting equalized movement to said disks.

13. In a control device as defined in claim 10 and wherein said control device includes means for moving one of said control members endwise in one direction and independently of its endwise movement by said disks.

14. In a control device as defined in claim 10 and wherein said disks are mounted on an indexible and endwise movable shaft, while said control members move parallel to said shaft and are spaced around said shaft.

15. In a control device as defined in claim 14 and wherein said control members are spaced around said indexible and endwise movable shaft with the individual control members located at different radial distances from the axis of said shaft.

16. In a control device as defined in claim 12 and wherein said indexible and endwise movable shaft has a fixed connection with one of said disks and a splined connection with the other of said disks, while means actuated by said shaft during its endwise movement in one direction has an operative connection with said other disk to move the latter axially in the opposite direction and toward the one disk that is fixed to said shaft.

References Cited in the file of this patent

UNITED STATES PATENTS

| Number | Name | Date |
|---|---|---|
| 2,156,596 | Lloyd | May 2, 1939 |
| 2,169,764 | Lange | Aug. 15, 1939 |
| 2,429,160 | Helmstein | Oct. 14, 1947 |
| 2,469,881 | Laubach | May 10, 1949 |
| 2,670,632 | Schuman | Mar. 7, 1954 |